United States Patent [19]

Hetzler

[11] Patent Number: 5,227,625
[45] Date of Patent: Jul. 13, 1993

[54] RETRO-REFLECTIVE VARIABLE-PITCH DIFFRACTION GRATING FOR USE IN A ROTARY ACTUATOR DISK FILE

[75] Inventor: Steven R. Hetzler, Sunnyvale, Calif.

[73] Assignee: International Business Machines Corporation, Armonk, N.Y.

[21] Appl. No.: 946,511

[22] Filed: Sep. 16, 1992

[51] Int. Cl.$^5$ ............................................. G01D 5/34
[52] U.S. Cl. .......................... 250/231.13; 250/237 G; 359/572; 359/573
[58] Field of Search .......... 250/237 G, 237 R, 231.13, 250/231.14, 230; 356/355, 356, 357, 358; 359/566, 569, 572, 573

[56] References Cited

U.S. PATENT DOCUMENTS

| | | | |
|---|---|---|---|
| 3,603,690 | 9/1971 | Hard | 356/354 |
| 4,745,293 | 5/1988 | Christensen | 250/577 |
| 4,862,468 | 8/1989 | Fink | 342/19 |
| 4,991,934 | 8/1989 | Hettrick | 350/162.21 |
| 5,020,910 | 6/1991 | Dunn et al. | 356/328 |
| 5,038,032 | 8/1991 | Nishimura et al. | 250/231.16 |

Primary Examiner—David C. Nelms
Attorney, Agent, or Firm—David J. Kappos

[57] ABSTRACT

A rotary actuator data recording disk file is provided with a retro-reflective diffraction grating for use in measuring the angular position of the rotary actuator arm. The diffraction grating has a diffraction pattern whose pitch varies along the length of the diffraction grating. The variation in pitch is arranged such that, as the rotary actuator arm swings about its pivot axis and the diffraction grating moves across an incident light beam and simultaneously rotates with respect to it, the diffracted beam travels back along the incident path. Thus, the source and detector of a laser position measurement system can remain fixed while measuring the position of a rotary actuator arm to which the diffraction grating is affixed. Due to its low mass and low cost, the diffraction grating can be attached to a rotary actuator arm, sealed into a disk file, used to servo-write the disk file, and left in the disk file when shipped, thus obviating the need for a clean room environment in which to perform the servo-write process.

19 Claims, 4 Drawing Sheets

FIG. 1 a) ANGULAR DEPENDENCE   b) LINEAR DEPENDENCE

RETRO-REFLECTIVE VARIABLE-PITCH DIFFRACTION GRATING FOR USE IN A ROTARY ACTUATOR DISK FILE

This invention relates in general to optical diffraction gratings, and in particular to a retro-reflective diffraction grating for use in positioning a data head in a rotary actuator disk file.

BACKGROUND OF THE INVENTION

A reflector used in combination with an interferometer and a laser light source provides a convenient means for determining a position reference for a body in space. However, if the body is capable of movement relative to the light source, the reflector must be designed to accommodate this. In particular, if the light source is fixed and the orientation of the body changes with respect to the light source, as with a rotary actuator arm in a data recording disk file, as the position of the body changes the incident light will strike different portions of the reflector, and the reflected light will have a reflected path that changes angle with respect to the incident light. As a result, detection of the reflected light requires additional optics or the ability to precisely move the interferometer.

In the prior art, this problem has been dealt with by using a corner cube type retro-reflector, which serves to reflect an incident light beam back to its source without regard to the angle of incidence. However, in cases where mass, size, and cost are important, the corner cube design is too bulky, large, and expensive to present a solution that is both practical and cost effective. Thus, there has existed an unmet need for an inexpensive and lightweight retro-reflector for attachment to a rotating body, capable of retro-reflecting an incident light beam without regard to the angle between the incident light beam and the rotating body.

An important application in which this need arises is servo writing for rotary actuator disk files. In this environment an external actuator position reference is required for writing precise servo patterns. According to the prior art, this reference is provided by a mechanical coupling to the rotary actuator or by placing a corner cube type retro-reflector on the rotary actuator. In either case, the drive may not be sealed during this operation due to the intrusion of the mechanical coupling or the presence of the corner cube, or alternatively, must be sealed using a special double sealed bearing in order to provide external access to the rotating mechanism. If the drive is not sealed, the servo write process must be conducted in a clean room environment, further adding to the expense of the drive.

Apart from servo writing, it would be advantageous in a rotary actuator disk file to provide head positioning information during operation by means of a fixed source light beam, an interferometer, and a retro-reflector attached to the rotary actuator arm. Previously, this has not been possible, due to the excessive size and weight of the corner cube type retro-reflector and a lack of an alternative means for retro-reflecting a fixed source light beam incident on an actuator arm without regard to the angle between the incident light beam and the actuator arm.

OBJECTS OF THE INVENTION

It is therefore an object of the present invention to provide a system for measuring the angular position of a pivoting body, such as a rotary actuator arm in a data recording disk file, the system including a fixed source light beam, a fixed detector, and a variable pitch retro-reflective diffraction grating affixed to the pivoting body.

It is another object of the invention to provide a retro-reflective diffraction grating having a variable pitch diffraction pattern arranged to retro-reflect a fixed source incident light beam as the diffraction grating pivots about a fixed point in space, independent of the angle between the incident light beam and the diffraction grating.

It is another object of the invention to provide a retro-reflector for use in the servo system of a rotary actuator data recording disk file.

It is another object of the invention to provide a servo writing system for use in a rotary actuator data recording disk file.

These and other objects will become more apparent when read in light of the following specification and drawings.

SUMMARY OF THE INVENTION

In accordance with the present invention, a rotary actuator data recording disk file is provided with a system for measuring the angular position of the rotary actuator arm. The system includes a fixed light beam, a fixed detector, and a retro-reflective diffraction grating having a diffraction pattern whose pitch varies along the length of the diffraction grating. The variation in pitch is arranged such that, as the rotary actuator arm swings about its pivot axis and the diffraction grating moves across the incident light beam and simultaneously rotates with respect to it, the diffracted beam travels back along the incident path. To achieve this effect, the pitch of the diffraction grating is varied according to the product of the diffraction order of the light beam and the wavelength of the light beam divided by double the cosine of the angle between the actuator arm and the light beam.

A diffraction grating constructed in accordance with the present invention may be used to measure the angular position of any body pivoting about a fixed point in space. To provide this measurement, the grating is affixed to the pivoting body and placed in the path of a laser interferometer system having a fixed light beam. As the body pivots, the grating will retro-reflect the incident light beam regardless of the angle between the incident light beam and the pivoting body.

The grating is particularly useful in attachment to a rotary actuator arm in a data recording disk file because of its low mass and low cost. According to one embodiment of the invention, the grating is used to position the rotary actuator arm during the servo write process. A fixed light beam is directed at the grating. The beam is retro-reflected by the grating and directed through a beamsplitter into a detector. The detector provides a measurement of the distance of travel of the beam. A servo write controller converts this measurement into the position of the data head over the disk. Based on this information, the servo write controller drives the servo electronics of the disk file to position the head over a desired track, and then directs the data electronics to record the appropriate servo information. Due to its advantageous weight and cost properties, the grating may be left in the drive after it is used to servo write the disk. As result, the servo write process can be performed after the drive is sealed, without the need for a clean-room environment.

According to a second embodiment, the grating, light source, and detector may be used to provide head positioning in the finished product, completely eliminating the need for servo information recorded on the disk surface.

DETAILED DESCRIPTION OF THE INVENTION

I. Diffraction Grating Design

Figure 1:
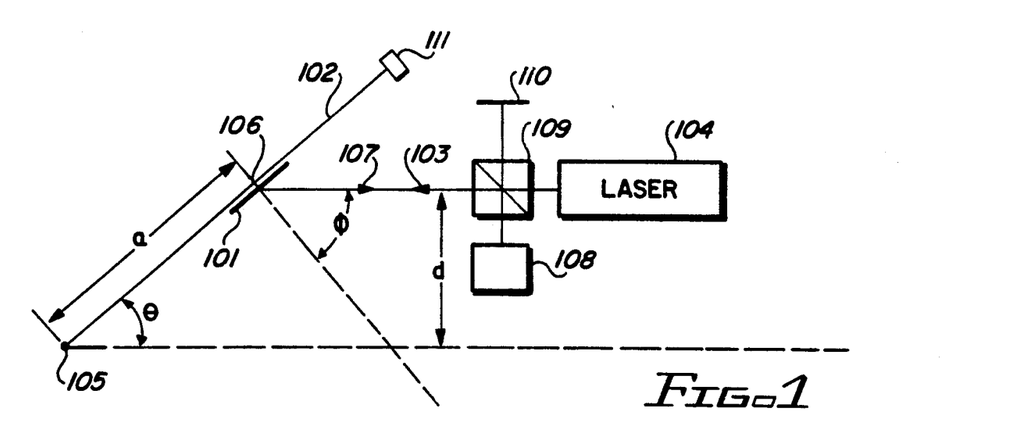
FIG. 1 is a simplified diagram illustrating the geometry of a rotary actuator disk file incorporating the present invention.

Shown in FIG. 1 is the geometry created when a fixed source light beam (where "fixed" as used herein is defined to include fixed source, fixed direction, and fixed wavelength) is incident on an actuator arm in a rotary actuator disk file. Included is reflective diffraction grating 101, rotary actuator arm 102 having pivot point 105, incident light beam 103, laser light source 104, strike point 106, reflected beam 107, detector 108, beamsplitter 109, retro-reflector 110, and data head 111. $\theta$ represents the angle between reflective diffraction grating 101 affixed to actuator arm 102, and incident light beam 103 (the pivot angle). $\phi$ represents the angle between incident light beam 103 and the normal to actuator arm 102, where $\phi = 90 - \theta$. "a" represents the distance along actuator arm 102 between pivot point 105 and strike point 106 where incident light beam 103 strikes grating 101. "d" represents the distance between incident light beam 103 and pivot point 105, perpendicular to incident light beam 103; therefore $\sin \theta = (d/a)$.

In operation, laser light source 104 generates incident light beam 103, which is directed at reflective diffraction grating 101 affixed to rotary actuator arm 102. Grating 101, to be described in detail below, retro-reflects a portion of incident light beam 103 along the incident path. Beamsplitter 109 directs a portion of reflected beam 107 into detector 108, and the remainder toward retro-reflector 110, where it is reflected back into beamsplitter 109. Retro-reflector 110 may be any suitable device such as a corner cube or plane mirror, subject to the geometry and tolerances of the design. Detector 108 and associated electronics measures the phase difference between the light traveling to diffraction grating 101 and the light traveling to retro-reflector 110. This measurement is then converted electronically into the distance travelled by the light beam, which distance is used by external computational means to determine the position of rotary actuator arm 102, and hence data head 111.

As actuator arm 102 rotates about pivot point 105, reflective diffraction grating 101 moves along incident light beam 103, changing the value of "a" and the angle $\theta$. Generally, in order to provide retro-reflection the grating spacing of reflective diffraction grating 101 must vary as a function of "a". The particular function of will depend on the diffraction order targeted for retro-reflection. It is well known in the art of diffraction physics that the highest intensity of diffracted light is obtained in the first order diffracted beam. Thus, in order to maximize the intensity available at the detector, the grating spacing chosen according to the preferred embodiment of the invention will be selected such that the first order diffracted beam emerges along the same path as the incident beam. However, it should be appreciated that another order of diffraction could be substituted in accordance with known properties of optical physics and without departing from the spirit and scope of the present invention.

To retro-reflect the first order diffracted beam, the grating spacing must be chosen such that $$\pm n\lambda = l(\sin \phi' - \sin \phi) \tag{1}$$

where
$n$ = diffraction order
$\lambda$ = laser wavelength
$l$ = grating pitch
$\phi$ = angle of the incident beam from the grating normal and
$\phi'$ = angle of diffracted beam from the grating normal.

Since $\sin \phi' = -\sin \phi$ for retro-reflection, $\sin \phi' = \sin \phi$, and equation (1) simplifies to $$\pm n \frac{\lambda}{l} = 2 \sin \phi. \tag{2}$$

Since $\phi = 90° - \theta$, $$n \frac{\lambda}{l} = 2 \cos \theta = 2 \sqrt{1 - \frac{d^2}{a^2}}. \tag{3}$$

Solving this equation for grating pitch $l$ yields $$l = \frac{an\lambda}{2 \sqrt{(a^2 - d^2)}} \tag{4}$$

which may be expressed alternatively as $$l = \frac{n\lambda}{2 \cos \theta}. \tag{5}$$

Thus, when attached to a rotary actuator arm, a reflective diffraction grating constructed such that its pitch varies according to equation (5) will retro-reflect a fixed source incident light beam regardless of the angle of incidence between the light beam and the grating.

Figure 2:
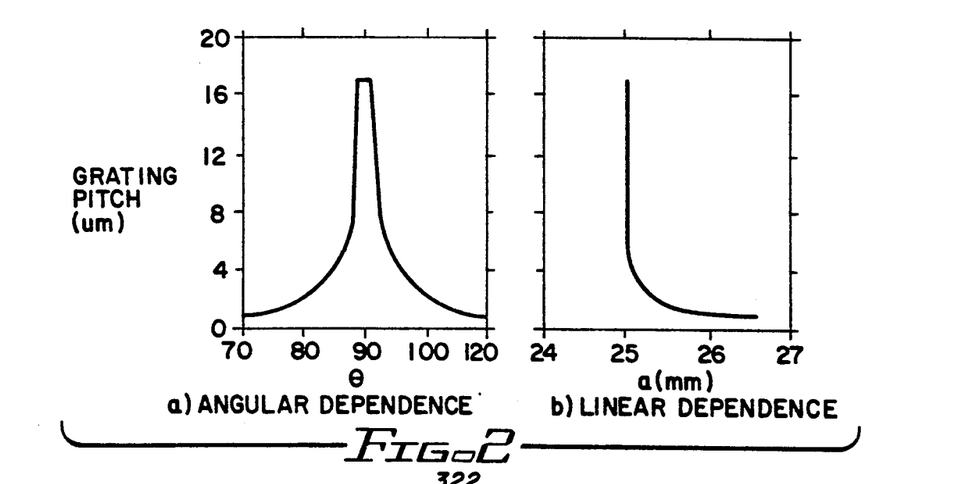
FIG. 2 is a graph illustrating the angular and linear dependence of the grating pitch for a retro-reflective diffraction grating according to the present invention.

Shown in FIG. 2 is a graphical representation of the grating pitch for a retro-reflective diffraction grating constructed according to the present invention and having a pitch as determined by equation (5) for a laser wavelength of 633 nm and $n = 1$. FIG. 2A shows grating pitch as a function of grating angle $\theta$. FIG. 2B shows grating pitch as a function of distance along the grating. In particular, FIGS. 2A and 2B illustrate two important details about the present invention. First, as the angle between the grating and the incident beam diverges from 90°, the grating pitch must be reduced sharply. Second, the grating function becomes discontinuous at $\theta = 90°$.

The requirement to reduce the grating pitch as $\theta$ decreases can be handled in a variety of ways, including precision manufacturing of the grating in order to maintain accuracy at very low pitch, increasing n or $\lambda$, using the limited rotation angle of the actuator arm (typically 25°) to reduce the range of $\theta$, or establishing an origin within the allowable range of $\theta$ values. In the preferred embodiment, the latter approach is chosen. Thus, as shown in FIG. 2A the retro-reflection origin of $\theta = 90°$ establishes the center of the allowable range of $\theta$ values.

The discontinuity in the grating function at $\theta = 90°$ may be handled by holding the pitch constant in this area, since the finite width of the detector is capable of accommodating some variation in the beam angle. For example, if the detector is at a distance of 100 mm from the grating and the detector has a cross-sectional diameter of 2.57 mm, there is an allowable angular error of 1.4 degrees. The grating can then be designed to have a constant pitch from 89°-91°. As the beam angle approaches 90°, the 1st order reflection will merge with a 0th order reflection, causing an increase in detected intensity. Thus, the error caused by using a constant pitch in the range of 89°-91° does not result in detectability problems.

Figure 3A:
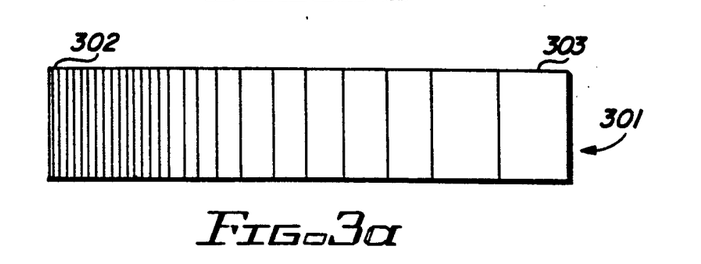
FIGS. 3a and 3b are a frontal views illustrating the pitch variation characteristics for a retro-reflective diffraction grating according to the present invention.

FIG. 3a shows a retro-reflective diffraction grating having a grating pitch that varies in accordance with equation (5). Retro-reflector 301 includes a back surface (not shown) which may be affixed to the rotary actuator arm of a data recording disk file, and a front surface having disposed thereon a diffraction grating with a variable pitch diffraction pattern that varies as a function of position along the grating. The spacing between successive lines varies continuously across the grating, with region 302 marking the highest pitched portion and region 303 marking the lowest pitched portion. The spacing distances meet the criteria established by equation (5).

Figure 3B:
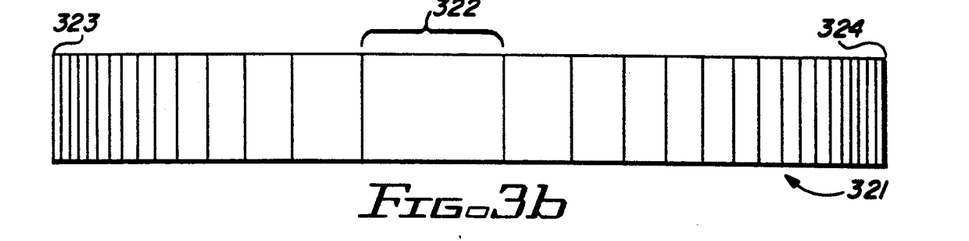

FIG. 3b shows a retro-reflective diffraction grating having a grating pitch that varies in accordance with equation (5) and includes a convergence point. Retro-reflector 321 includes a back surface and front surface as described above, with a diffraction grating having a variable pitch diffraction pattern that varies as a function of position along the grating. Region 322 marks the convergence point, where the 1st order reflected beam and the 0th order reflected beam merge. The grating functions equivalent to a plane mirror in this region. Regions 323 and 324 mark the highest pitched portions of the grating. The spacing between successive lines varies across the grating as described by equation (5).

Figure 4:
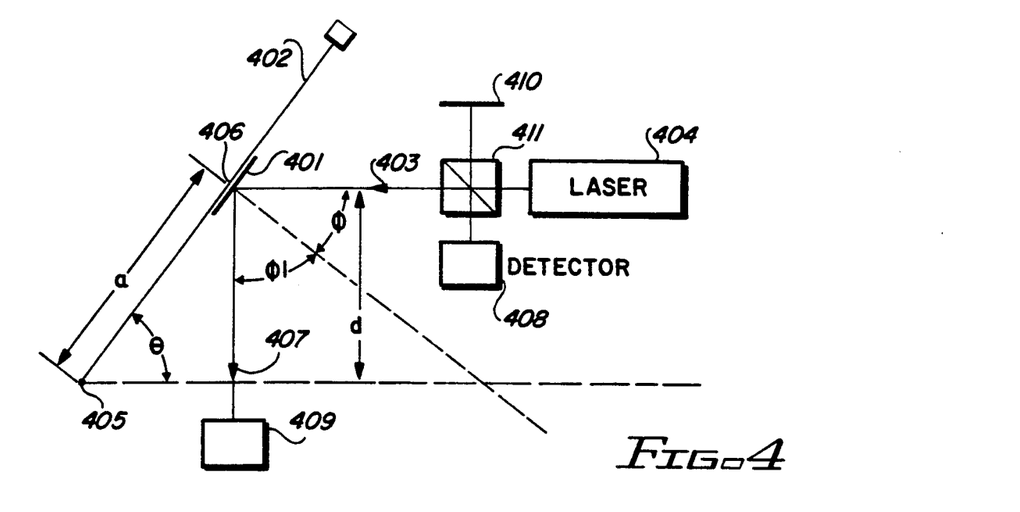
FIG. 4 is a simplified diagram illustrating the geometry of a rotary actuator disk file incorporating an alternative embodiment of the present invention.

The reflective diffraction grating described above may be alternatively designed to reflect the first order beam at a constant angle not equal to 180°. To achieve this effect, the grating pitch is varied according to equation (1) without setting the incidence angle equal to the reflection angle. The resultant geometry is illustrated in FIG. 4. The system is similar to that shown in FIG. 1, except that an additional retro-reflector 409 typically in the form of a corner cube is placed along the path of reflected light beam 407. Retro-reflector 409 returns reflected beam 407 to reflective diffraction grating 401, where it is re-reflected along substantially the same path as incident light beam 403 and directed into detector 408 as described above. It is to be noted that the path of the re-reflected beam may diverge from that of the incident beam as actuator arm 402 rotates if a corner cube is used as retro-reflector 409. This may result in detectability problems that increase as the actuator arm rotates away from the designed-for angle. Thus, the system of FIG. 4 may have a limited range in which it is capable of providing an accurate position reference for rotary actuator arm 402. Nevertheless, the alternative design presented in FIG. 4 may be useful in cases where the available geometry or grating manufacturability are constrained, such as where the incident beam angle $\theta$ cannot be designed around the convergence point ($\theta = 90°$) or where the manufacturing process will not create sufficient grating pitch to provide retro-reflection.

A variable pitch retro-reflective diffraction grating in accordance with the present invention may be formed by depositing non-reflective portions on a reflective surface, or alternatively by creating a relief pattern in a reflective surface to produce outer reflective planes and inner reflective planes. The latter approach will yield a higher diffraction efficiency. Diffraction gratings are typically fabricated by producing replicas from a high quality master. The master pattern for the variable pitch grating may be produced by any number of means, including a ruling engine (for scribing the pattern into a substrate), lithography or holography. Low cost, low mass replicas of the master pattern may be manufactured by standard techniques such as embossing, injection molding or photographic reproduction. The individual gratings consist of thin polyester films, compact disk-like material or photographic film, respectively.

It is to be noted that in manufacturing the grating, it is not strictly required to provide a grating pitch variation exactly as described in equation (5). Instead, a piece-wise linear function approximating the results of equation (5) may be used. Such a function is constrained only by the maximum allowable deviation in reflected beam angle, which is a function of the particular detector chosen as well as the particular geometry of the implementation. Such an adaptation would be apparent to one of skill in the art, and is accordingly considered to be within the spirit and scope of the present invention.

II. Application of Variable Pitch Diffraction Grating to Measuring the Position of a Pivoting Body While the preferred embodiment addresses applicability to rotary actuator data recording disk files, the present invention is well suited to provide a position reference for any body pivoting about a fixed point in space. Particular examples of applicability arise in the area of robotics, where pivoting control arms must be accurately positioned.

Figure 5:
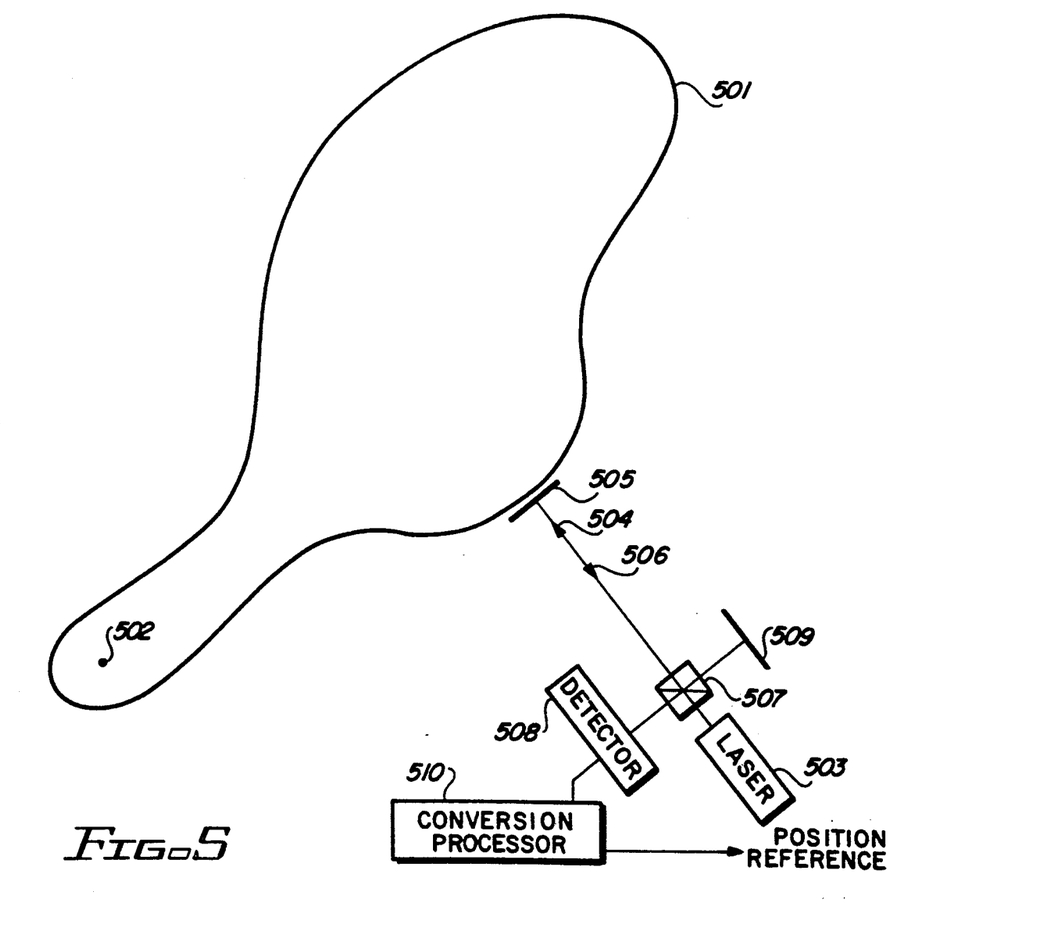
FIG. 5 is a simplified diagram illustrating a positioning system for measuring the position of a pivoting body according to the present invention.

Shown in FIG. 5 is an exemplary embodiment of a positioning system according to the present invention used to measure the position of a pivoting body. They system includes body 501 having pivot point 502, laser 503, incident light beam 504, retro-reflective diffraction grating 505 having a variable pitch grating arranged in accordance with equation (5), retro-reflected light beam 506, beamsplitter 507, detector 508, retro-reflector 509, and conversion processor 510. In operation, laser-light source 503 directs a fixed light beam at retro-reflective diffraction grating 505, which is affixed to body 501.

Grating 505 retro-reflects the incident light beam as retro-reflected light beam 506. Retro-reflected light beam 506 enters beamsplitter 507. Beamsplitter 507 directs a portion of reflected beam 506 into detector 508, and the remainder toward retro-reflector 509, where it is reflected back into beamsplitter 507. Retro-reflector 509 may be a simple plane mirror, a corner cube, or any other suitable means for reflecting incident light back to its source. Detector 508 measures the distance travelled by the light beam, and provides the result to conversion processor 510, which uses the known geometry of the system to compute the position of body 501. It is to be noted that the position of body 501 may readily be computed in terms of a desired reference system—such as the pivot angle of the entire body, or the cartesian coordinates of a given point of the body—using standard geometrical calculations.

When body 501 rotates about pivot point 502, grating 505 moves across the fixed incident light beam 504, and simultaneously rotates with respect to it. Diffraction grating 505 is provided with a variable pitch diffraction pattern arranged as described in equation (5) to retro-reflect incident light beam 504. Thus, in accordance with the present invention, as body 501 pivots, the grating pitch at the particular point along the grating struck by the light beam causes the first order diffracted beam to reflect back along the incident beam path.

Figure 6:
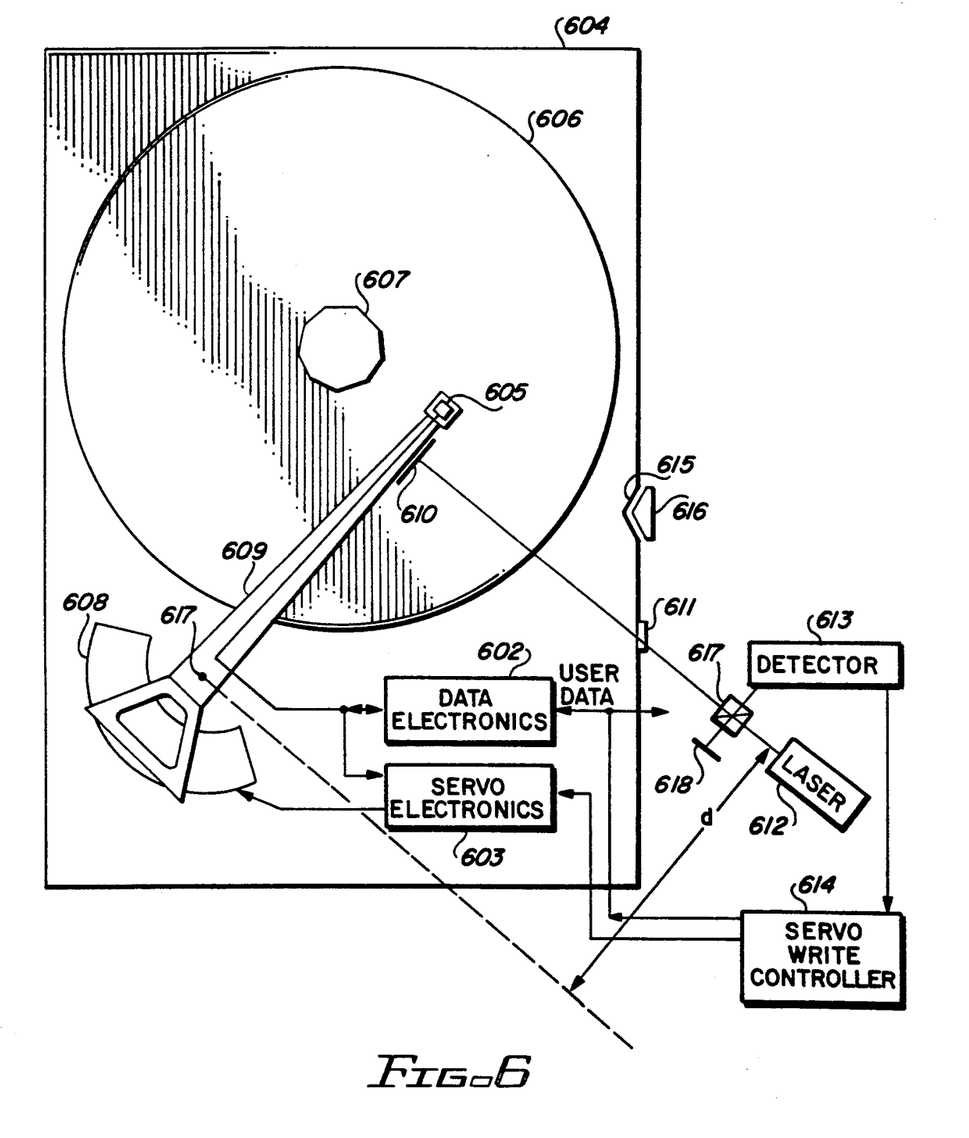
FIG. 6 is a simplified diagram illustrating a servo writing system for use in a rotary actuator disk file according to the present invention.

III. Application of Variable Pitch Diffraction Grating to Servo Writing a Rotary Actuator Disk File A retro-reflective diffraction grating constructed as described above is particularly useful for measuring the angular position of a rotary actuator arm in data recording disk file during the manufacturing process when servo information is recorded on the disk surfaces. Shown in FIG. 6 is a rotary actuator disk file configured to record servo information in accordance with the present invention. The system includes data electronics 602, servo electronics 603, housing 604 having aperture 611, data head 605, disk 606, drive means 607, voice coil motor 608, actuator arm 609 having pivot point 617, retro-reflective diffraction grating 610, window 611, laser light source 612, detector 613, servo write controller 614, alignment slot 615, pin 616, beamsplitter 617, and retro-reflector 618. In operation, data electronics 602 sends and receives user data and provides signals to read and write the user data from and to disk 606 through head 605. The servo write controller 614 receives position information from detector 613, and issues servo signals to servo electronics 603 which provides actuator control through voice coil motor 608, affecting movement of actuator arm 609. Meanwhile, drive means 607 rotates disk 606 past data head 605 at a constant rate. Housing 604 encloses the entire apparatus to stabilize it and protect it from environmental effects.

More particularly, during the servo write process, head 605 is used to write servo information on disk 606, for later use as a position reference during user operation. The position reference during the servo write process is provided by laser light source 612, reflective diffraction grating 610, and detector 613. Light source 612 directs a light beam through aperture 611 into the disk file in the direction of grating 610. Grating 610 retro-reflects the incident light beam, which re-emerges from the disk file through aperture 611 and enters beamsplitter 617. Beamsplitter 617 directs a portion of the reflected light beam into detector 613, and the remainder toward retro-reflector 618, where it is reflected back into beamsplitter 617. Detector 613 and associated electronics measures the distance travelled by the light beam and provides this measurement to servo write controller 614, which determines the exact position of data head 605 over disk 616 using standard geometry calculations. Controller 614 also controls the writing of servo information on disk 606 via data electronics 602, and controls the positioning of the actuator arm using servo electronics 603.

The geometry of the servo writing system is fixed by providing in the disk file a clamp or slot for establishing an external position reference, such as alignment slot 615 shown in FIG. 6. The external reference is then provided by a mating protrusion such as pin 616 which is fixed in space with respect to laser 612 and detector 613. Laser 612 and detector 613 are likewise fixed in space to provide a fixed light beam and a fixed of detection, respectively.

As servo information is recorded, actuator arm 609 moves data head 605 across the radius of disk 606. As actuator arm 609 pivots about point 617, grating 610 moves with respect to the light beam provided by laser 612 such that the light beam strikes grating 610 in varying positions along the grating surface. Diffraction grating 610 is provided with a variable pitch diffraction pattern arranged as described in equation (5) to retro-reflect the fixed incident light beam provided by laser 612 back to its source. Thus, in accordance with the present invention, for every relevant actuator arm angle, the grating pitch at the particular point along the grating struck by the light beam causes the first order diffracted beam to reflect back along the incident beam path.

According to a particular implementation of the above described preferred embodiment servo writing system, a 3.5 inch form factor disk file with a 50 mm actuator arm is chosen. A helium neon laser is used having a wavelength of 0.633 micrometers. The angle between the actuator arm and the incident light beam ranges from 75°–105°. A light beam offset of D=25 mm is chosen. The resulting diffraction grating as specified by equation (5) is that depicted in FIG. 2b. The grating pitch ranges across the length of the grating from 1.2 micrometers to 17 micrometers.

Since the geometry of the system is well defined, only a small aperture 611 is required in the side of the disk file. Such an aperture may be in the form of a window covered with any suitable material such as glass or plastic. Since no mechanical coupling is required inside the disk file to position the actuator arm, the servo writing system is low cost and non-invasive. Since the reflective diffraction grating is lightweight and inexpensive, it does not appreciably affect the inertia or dynamics of the actuator or the cost of the disk file. Thus, the disk file may be sealed prior to servo writing and the file shipped with the grating affixed to the actuator.

Figure 7:
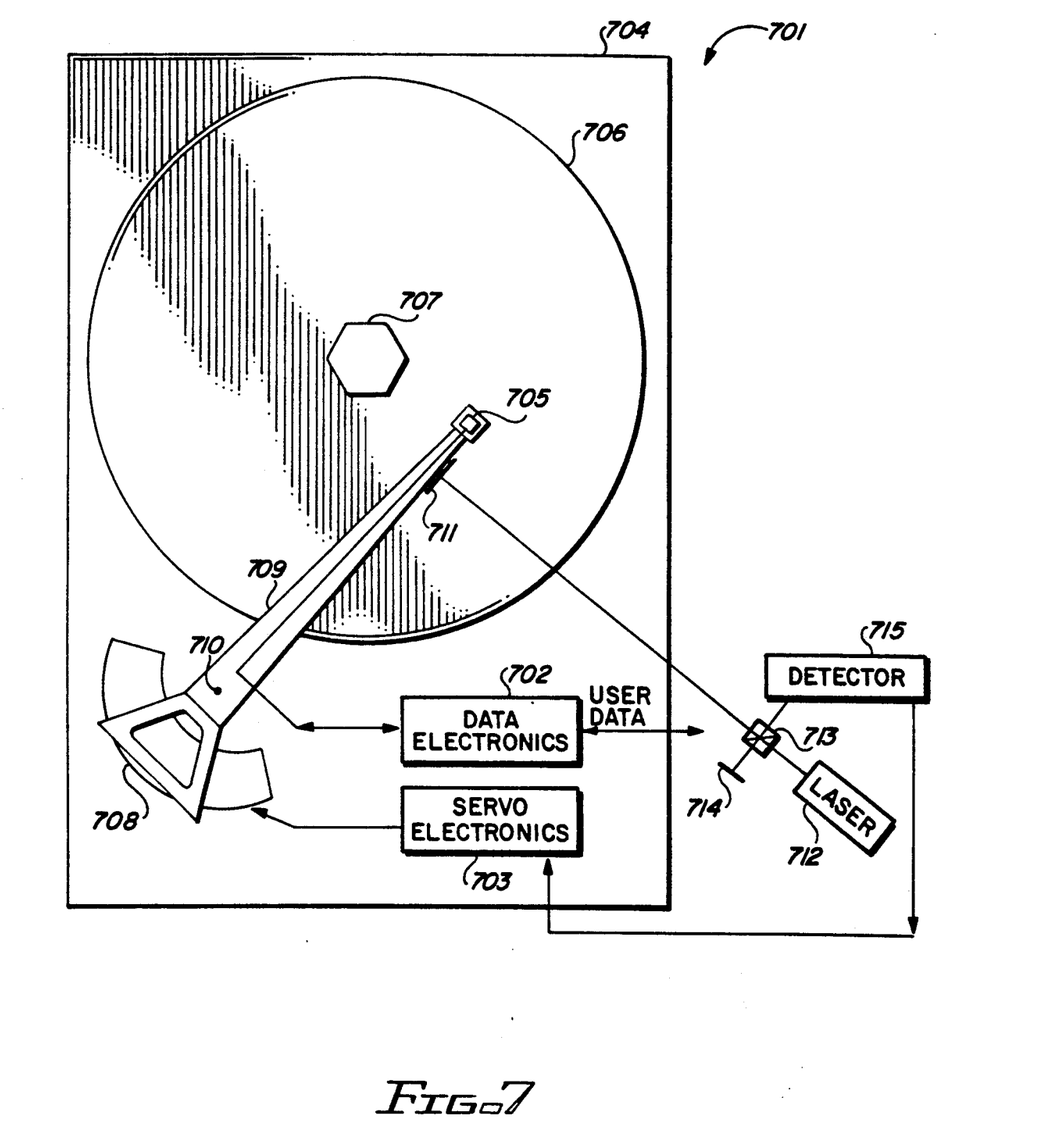
FIG. 7 is a simplified diagram illustrating a servo positioning system for use in a rotary actuator disk file according to the present invention.

IV. Application of Variable Pitch Diffraction Grating to Servo System of Rotary Actuator Disk File In a further embodiment, the present invention may be used to provide servo information in a rotary actuator disk file during operation. Such an embodiment is shown in FIG. 7, wherein rotary actuator disk file 701 includes data electronics 702, servo electronics 703, housing 704, data head 705, disk 706, drive means 707, voice coil motor 708, actuator arm 709 having pivot point 710, reflective diffraction grating 711, laser light source 712, beamsplitter 713, planar retro-reflector 714, and detector 715. The operation of disk file 701 is similar to that of the system shown in FIG. 6, no feedback is provided from head 705 to servo electronics 703 to position actuator arm 709 during user operation and no servo information is included on disk 706. Instead, all head positioning information during user operation is provided by laser 712, retro-reflective diffraction grating 711, and detector 713. Laser 712 provides a fixed light beam directed at grating 711. Grating 711 is provided with a varying pitch diffraction pattern arranged in accordance with equation (5) to retro-reflect the fixed incident light beam as actuator arm 709 pivots about pivot point 710. Detector 713 receives the returning light beam, measures its distance of travel, and provides this information to servo electronics 703. Servo electronics 703 determines the exact position of data head 705 over disk 706 using distance information and standard geometry calculations. Servo electronics 703 also drives voice coil motor 708 to adjust the position of data head 705. The disk configuration shown in FIG. 7 results in two important advantages: first, since all positioning information is provided by laser 712, grating 711, and detector 713; the servo writing process that normally occurs during manufacturing may be completely omitted; second, since no servo information is written on disk 706, more space is available for recording user data, and greater overall recording capacity may be achieved.

While the invention has been particularly described and illustrated with reference to a preferred embodiment, it will be understood by those skilled in the art that changes in the description or illustrations may be made with respect to form or detail without departing from the spirit and scope of the invention.

Having thus described the invention, what is claimed is:

1. A retro-reflector comprising:
a reflective diffraction grating having a variable pitch diffraction pattern disposed along its length, said diffraction pattern having spacings arranged to retro-reflect a fixed incident light beam as the diffraction grating pivots about a fixed point in space, independent of the angle between said incident light beam and said diffraction grating.

2. A retro-reflector as recited in claim 1, wherein said reflective diffraction grating is characterized by a planar surface having reflective portions and non-reflective portions.

3. A retro-reflector as recited in claim 1, wherein said reflective diffraction grating is characterized by a relief pattern having reflective outer relief planes and reflective inner relief planes.

4. A retro-reflector for retro-reflecting a fixed light beam incident on a pivoting body, comprising:
a back surface for attachment to said pivoting body;
a front surface, opposite said back surface, having disposed thereon a reflective diffraction grating having a variable pitch diffraction pattern along its length, said pitch varying according to the product of the diffraction order and the wavelength of said light beam divided by double the cosine of the angle between said pivoting body and said light beam.

5. A retro-reflector as recited in claim 4, wherein said variable pitch diffraction pattern includes a substantially planar portion, a first variable pitch portion disposed to one side of said substantially planar portion, and a second variable pitch portion disposed to the opposite side of said substantially planar portion.

6. A system for measuring the position of a pivoting body, comprising:
a light source for providing a fixed light beam;
a detector for receiving a light beam provided by said light source and retro-reflected from said pivoting body and for measuring the length of travel of said retro-reflected light beam;
conversion means for converting said length of travel to the corresponding position of said pivoting body; and
a reflective diffraction grating, affixed to said pivoting body along the incident path of said light beam, having a variable pitch diffraction pattern disposed along its length, said diffraction pattern having spacings arranged to retro-reflect said incident light beam independent of the pivot angle between said pivoting body and said incident light beam.

7. A system for measuring the position of a pivoting body as recited in claim 6, wherein said pitch varies according to the product of the diffraction order and wavelength of said light beam divided by double the cosine of the angle between said pivoting body and said light beam.

8. A system for measuring the position of a rotary actuator arm in a data recording disk file, comprising:
a light source for providing a fixed light beam;
a detector for receiving a light beam provided by said light source and retro-reflected from said actuator arm and for measuring the length of travel of said retro-reflected light beam;
a converter for converting said length of travel to the corresponding angular position of said actuator arm; and
a reflective diffraction grating, affixed to said actuator arm along the incident path of said light beam, having a variable pitch diffraction pattern disposed along its length, said diffraction pattern having spacings arranged to retro-reflect said incident light beam independent of the pivot angle between said actuator arm and said incident light beam.

9. A system for measuring the position of a rotary actuator arm as recited in claim 8, wherein said pitch varies according to the product of the diffraction order and wavelength of said light beam divided by double the cosine of the angle between said rotary actuator arm and said light beam.

10. A method for a servo writing a rotary actuator data recording disk file, comprising the steps of:
directing a fixed light beam at a reflective diffraction grating affixed to an actuator arm positioned along the incident path of said light beam, said reflective diffraction grating having a variable pitch diffraction pattern disposed along its length, said diffraction pattern having spacings arranged to retro-reflect said incident light beam independent of the pivot angle between said actuator arm and said incident light beam;
receiving a light beam retro-reflected from said actuator arm;
measuring the length of travel of said retro-reflected light beam;
converting said length of travel to the corresponding position of said actuator arm over a data storage disk;
adjusting the positioning of said actuator arm to a desired location in accordance with said position information; and recording servo information on said disk using a data head attached to said actuator arm.

11. A method for servo writing as recited in claim 10, wherein said pitch varies according to the product of the diffraction order and wavelength of said light beam divided by double the cosine of the angle between said actuator arm and said light beam.

12. A servo writing system for use with a rotary actuator data recording disk file, comprising:
 a light source for providing a fixed light beam;
 a reflective diffraction grating, affixed to an actuator arm positioned along the incident path of said light beam, having a variable pitch diffraction pattern disposed along its length, said diffraction pattern having spacings arranged to retro-reflect said incident light beam independent of the pivot angle between said actuator arm and said incident light beam;
 a detector for receiving a light beam provided by said light source and retro-reflected from said actuator arm and for measuring the length of travel of said retro-reflected light beam;
 a servo write controller for
  (a) converting said length of travel to the corresponding position of said actuator arm over a data storage disk, and
  (b) providing signals to an actuator driver to adjust the positioning of said actuator arm to a desired location in accordance with said position information.

13. A servo writing system as recited in claim 12, wherein said pitch varies according to the product of the diffraction order and wavelength of said light beam divided by double the cosine of the angle between said actuator arm and said light beam.

14. A servo writing system as recited in claim 13, further comprising at least one alignment pin, fixed in space with respect to said light source and said detector, for providing a positioning reference for use by said data recording disk file.

15. A servo writing system as recited in claim 14, wherein said servo write controller further provides signals to a data channel to record servo information on said disk using a data head attached to said actuator arm.

16. A rotary actuator data recording disk file comprising:
 a data storage disk;
 a rotary actuator arm having a first end portion with a pivot point located therein and a second end portion having means for carrying a recording head positionable over said data storage surface at the other end;
 a housing for enclosing said data storage surface and said actuator arm; and
 a reflective diffraction grating, affixed to said actuator arm, having a variable pitch diffraction pattern disposed along its length, said diffraction pattern having spacings arranged to retro-reflect a fixed incident light beam as said rotary actuator arm pivots about said pivot point, independent of the angle between said incident light beam and said diffraction grating.

17. A rotary actuator data recording disk file as recited in claim 16, further comprising:
 a light source for providing said fixed incident light beam to said reflective diffraction grating; and
 means for receiving said retro-reflected light beam and for measuring the length of travel of said retro-reflected light beam.

18. A rotary actuator data recording disk file as recited in claim 16, further comprising:
 an aperture, disposed in said housing, for passing said incident light beam into the space enclosed by said housing and said retro-reflected light beam out of the space enclosed by said housing.

19. A rotary actuator data recording disk file as recited in claim 16, wherein said data storage disk contains no pre-recorded servo information, and further comprising means responsive to the retro-reflected light beam for recording servo information on said data storage disk.

* * * * *

UNITED STATES PATENT AND TRADEMARK OFFICE
CERTIFICATE OF CORRECTION

PATENT NO. : 5,227,625
DATED : July 13, 1993
INVENTOR(S) : S. R. Hetzler

It is certified that error appears in the above-indentified patent and that said Letters Patent is hereby corrected as shown below:

Column 3, line 53, delete "(d/a).", insert -- $(\frac{d}{a})$ . --.

Column 7, line 16, delete "given point of the", insert -- given point on the --.

Column 8, line 16, delete "and a fixed of detec-", insert -- and fixed point on detec-.

Signed and Sealed this

Sixth Day of June, 1995

Attest:

BRUCE LEHMAN

Attesting Officer  Commissioner of Patents and Trademarks